Nov. 6, 1956  G. J. HARMAN ET AL  2,769,575
AIRPLANE REFUELING SYSTEM WITH RATE OF FLOW METERING
Filed Dec. 6, 1952  4 Sheets-Sheet 1

INVENTORS
GERALD J. HARMAN
HARWOOD D. HOOKER
ROBERT T. RUMMEL

By George C. Sullivan
Agent

Nov. 6, 1956    G. J. HARMAN ET AL    2,769,575
AIRPLANE REFUELING SYSTEM WITH RATE OF FLOW METERING
Filed Dec. 6, 1952    4 Sheets-Sheet 2

INVENTORS
GERALD J. HARMAN
HARWOOD D. HOOKER
ROBERT T. RUMMEL
By George C. Sullivan
Agent Nov. 6, 1956 G. J. HARMAN ET AL 2,769,575
AIRPLANE REFUELING SYSTEM WITH RATE OF FLOW METERING
Filed Dec. 6, 1952 4 Sheets-Sheet 3

INVENTORS
GERALD J. HARMAN
HARWOOD D. HOOKER
ROBERT T. RUMMEL
By *George C. Sullivan*
Agent Nov. 6, 1956   G. J. HARMAN ET AL   2,769,575
AIRPLANE REFUELING SYSTEM WITH RATE OF FLOW METERING
Filed Dec. 6, 1952   4 Sheets-Sheet 4
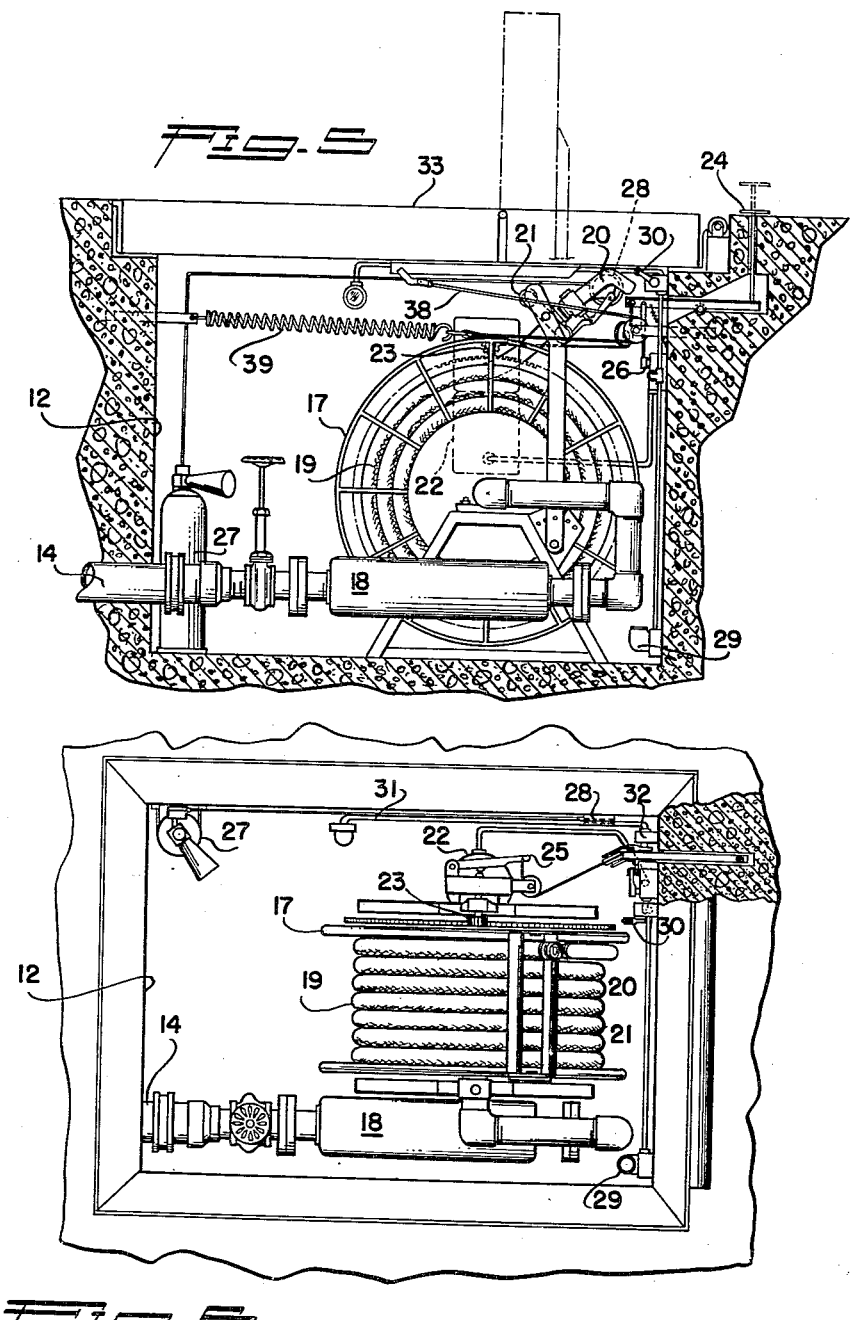
INVENTORS
GERALD J. HARMAN
HARWOOD D. HOOKER
ROBERT T. RUMMEL
By George C. Sullivan
Agent

United States Patent Office 2,769,575
Patented Nov. 6, 1956

2,769,575

AIRPLANE REFUELING SYSTEM WITH RATE OF FLOW METERING

Gerald Jerome Harman, Beverly Hills, Harwood D. Hooker, Sunland, and Robert T. Rummel, Burbank, Calif., assignors to Lockheed Air Terminal, Inc., Burbank, Calif.

Application December 6, 1952, Serial No. 324,582

1 Claim. (Cl. 222—71)

This invention relates to an airplane refueling system for use at airplane loading stations, to simplify the refueling operation and decrease the time required for servicing an airplane.

It is an important object of this invention to provide an underground refueling system, located in the airplane loading area, to refuel and service the airplane during the unloading and loading thereof. The underground refueling system involves the installation of fuel meters in a covered pit which supplies fuel to hose reels installed in covered pits adjacent the wings of the parked airplane, hoses being pulled off the reels for simultaneously refilling the wing fuel tanks of the airplane, with fuel delivery to the tanks controlled at nozzles on the free ends of the hoses. The pit covers are made strong enough to permit the maneuvering of airplane wheels thereover, and when access is to be had to the meter and hose reels, the pit covers are partly opened.

It is a further object of this invention to provide an underground refueling system of the type described wherein the pits containing the refueling equipment are provided with sealed but readily removable covers, a portion of the covers being hinged relative to the balance thereof whereby the hinged portion can be opened for access to the pits, the hinged portions being counterbalanced and arranged to disconnect all electrical circuits in the pit when the cover is closed, the meter pit cover being additionally arranged to shut off the incoming fuel line when closed.

It is also an object of this invention to provide a refueling system of the type described including a plurality of fuel meters arranged in parallel whereby an airline customer may be assigned its own meter for operation by its own personnel. This arrangement permits self-service by personnel of the airline and accumulates the total of fuel used thereby over a desired accounting period. For example, one meter can be used by airport operators for transient customers and the others assigned to regular airline customers, the meters being brought into use by key controlled valves.

It is a further object of this invention to provide an underground refueling system for airplanes, both to eliminate the fire and collision hazard of maneuvering tank trucks about a parked airplane, and to permit fueling of both sides of an airplane wing simultaneously.

It is also an object of this invention to provide an airplane refueling system of the type described capable of maximum fuel delivery and adaptable, by change of hose and/or hose nozzle to over or underwing or central point airplane refueling practices.

Other objects and features of the invention will be readily understood from the following detailed description of a typical preferred form of the invention wherein reference will be made to the accompanying drawings in which:

Fig. 5 is a section through one of the hose reel pits to show the installation of the hose reel therein;

Figure 6 is a plan view of the hose reel pit, with the cover removed;

Figure 7 is a section through the meter pit cover, taken on the line 7—7 of Figure 2 showing the latch mechanism supporting the hinged panel in its open position; and Figure 8 is a section through the edge of the pit and cover showing the provision of a seal between the pit and cover.

As shown on the drawings:

The underground refueling system of this invention forms a single system of the multiple refueling system shown and described in the Harman, et al. application, Serial Number 320,726, filed November 15, 1952, reference to which may be had for the details of the fuel supply to the metering and hose pits of the present invention.

Figure 1:
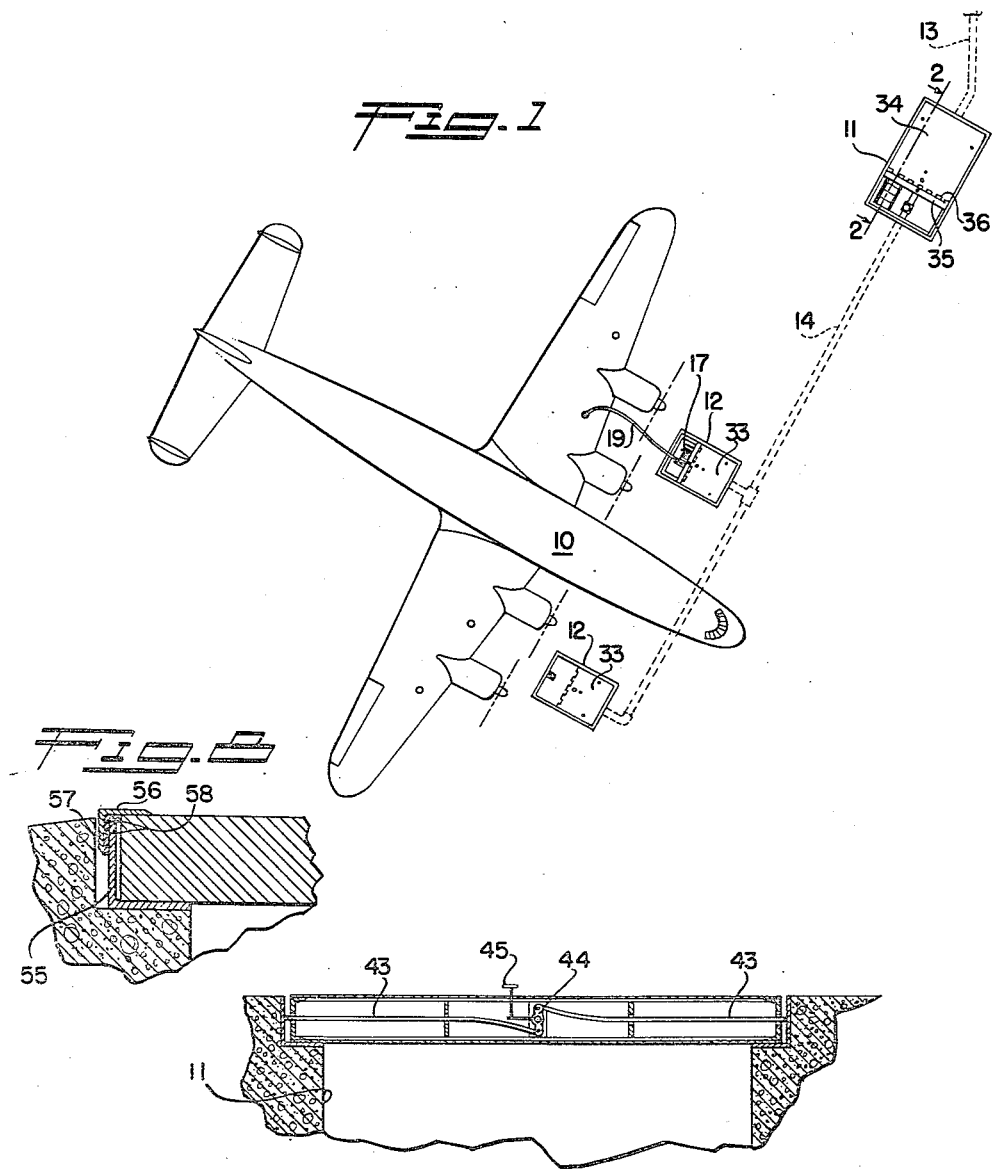
Figure 1 is a plan view of a refueling system embodying the features of this invention, an airplane being shown in loading position adjacent the meter and hose pits, with a fuel hose from one hose pit in position to discharge fuel into one of the wing tanks of the airplane.

In Figure 1 an airplane 10 is shown in loading position relative to meter and hose reel pits 11 and 12. The hose reel pits 12 are positioned to supply fuel to the wing tanks of the airplane, while the meter pit 11 is off to one side for convenience. Fuel is supplied to the meter pit 11 from a central tank and pump unit (not shown) through a pipe line 13 and from the meter pit 11 to the hose reel pits 12 by a line 14. The meter pit 11 is provided with an air and vapor filter 15 to deliver clean liquid fuel to a plurality of meters 16 and thence to hose reels 17 in each hose reel pit, and surge chambers 18 are located in the fuel lines 13 and 14 ahead of the filter 15 and hose reels 17. Each hose reel 17 carries a hose 19 and nozzle 20, the hose 19 being connected to the fuel line 14 by a swivel joint at the hub of the reel 17, so that the hose remains full of fuel when on the reel, and fuel flow into the airplane tanks is controlled at the hose 19 nozzle. The hose can be pulled off the reel between adjustable guide rollers 21 to minimize wear, and can be wound back on the reel by a motor 22 operating a pinion 23 through a reduction gear box and a clutch. A treadle 24 operates a motor starting switch and a clutch lever 25 to rotate the reel backwardly while the operator guides the hose back on the reel. The motor circuit contains a lid operated switch 26 to render the circuit inoperative when the lid or cover is closed.

The reel pits 12 also contain a fire extinguisher 27 with an automatic discharge head 28 designed to fill the pit with a smothering blanket of foam or gas when the fire extinguisher is discharged. An electric outlet 29, controlled by a lid operated switch 30 provides an auxiliary power circuit for operation of ground air conditioning equipment, engine starting, and other services for the airplane. The pits are also equipped with lighting circuits 31 controlled by a lid operated switch 32.

The pits 11 and 12 are covered flush by removable covers 33 and 34 which must be strong enough to permit airplane wheels to roll thereover. For ease of access to the pits the covers are made in two sections, one part 35 being hinged at 36 to the other to form an entrance door. This door 35 is counterbalanced by a lever 37 and cable system 38 connected to a spring 39 pretensioned to balance the heavy weight of the door in its closed position. A latch 40 holds the door down on the pit rim and a hand ring 41 engages the latch to release the same. Side links 42 are pivoted to the edges of the door to engage pins 43 carried by the other part of the cover when the door is open, these pins being retractable by linkage 44 operated by a foot pedal 45, as shown in Figure 7, when it is desired to close the door. As shown in side view in Figure 2, a guide member 46 over which the links slide, prevents the link ends 47 from dragging on the pit frame as the door is opened.

Figure 8 shows how the pit cover can be sealed against entry of water into the pit, without subjecting the seal material to the weight of or loads imposed on the cover. The pit opening for the cover is provided with an angle iron frame 55, the upstanding leg of which is spaced from the wall of the pit opening, and an angle iron 56 is applied to the edge of the cover, with the downwardly extending leg 57 extending into the space between the wall of the pit frame and the upstanding leg of the frame 55. Suitable sealing material 58 is inserted between the downwardly extending leg of the angle iron on the cover and the cover proper to seal against the edge and side of the upstanding leg of the frame 55. The cover weight and any load thereon is supported by the bottom of the cover bearing on the horizontal portion of the frame 55 limiting the compression of the sealing material 58.

The door counterbalance for the meter pit cover is also used to open a self-closing valve 48 in the fuel line 13 to the filter. A cable 49 containing a yielding link 50 is connected between a lever 51 on the valve 48 and the door lever 37. Opening the door pulls on the cable 49 to open the valve 48. Closing the door releases the tension on the cable 49 to allow the valve 48 to return to its closed position. As described in the companion patent application identified herein, closing the meter pit door also deactivates the fuel pumping circuit controls by opening a switch 52 in the control circuit.

Figure 2:
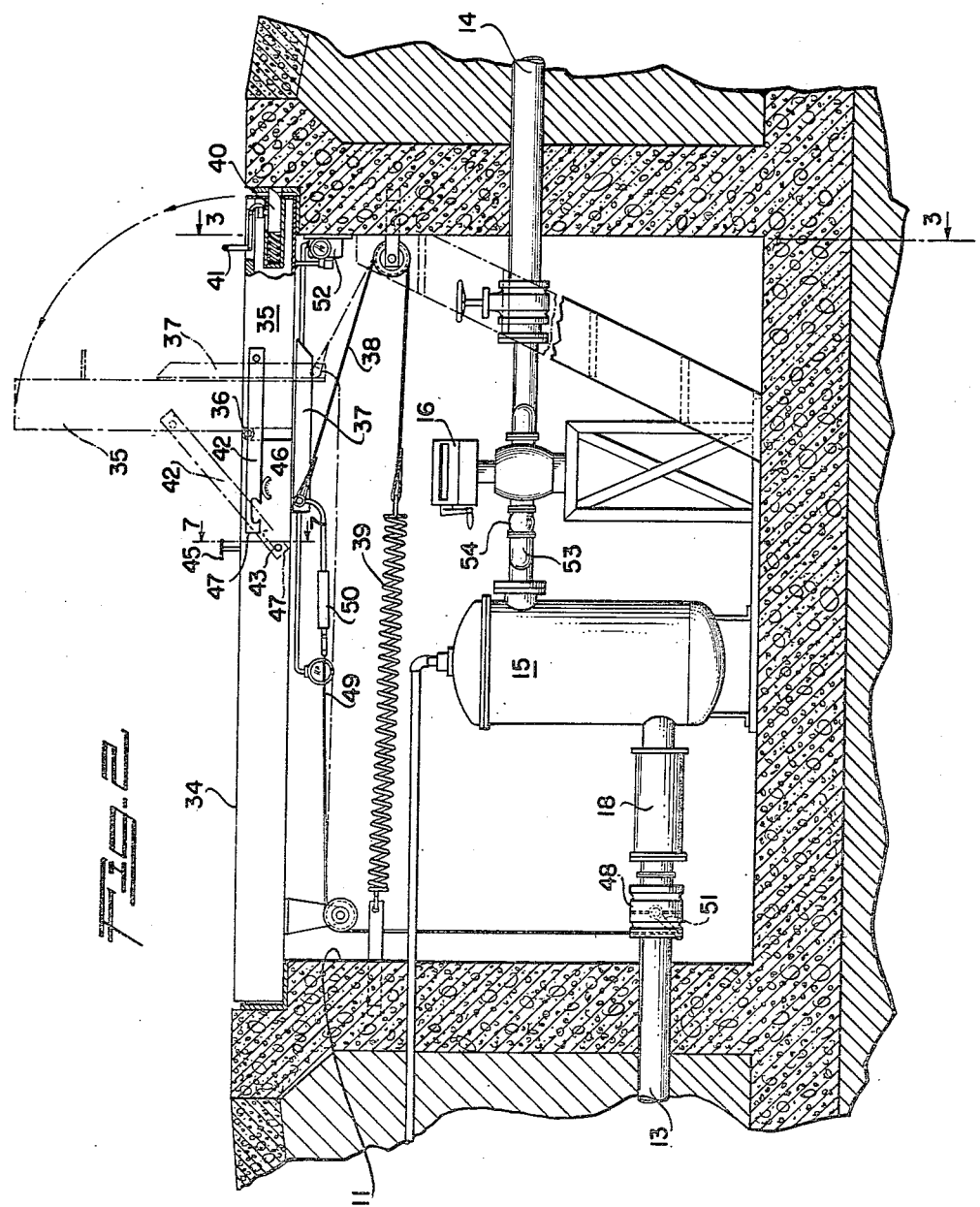
Figure 2 is a longitudinal section through the meter pit, taken on the line 2—2 of Figure 1 to show details thereof.
Figure 3:
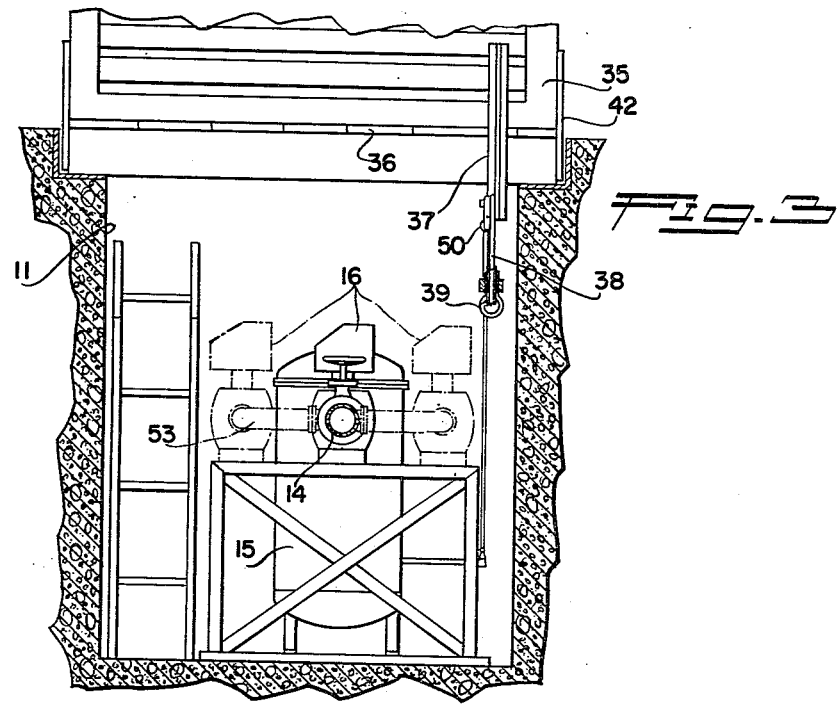
Figure 3 is a section on the line 3—3 of Figure 2 to show the pit cover in open position, together with the multiple meter installation.
Figure 4:
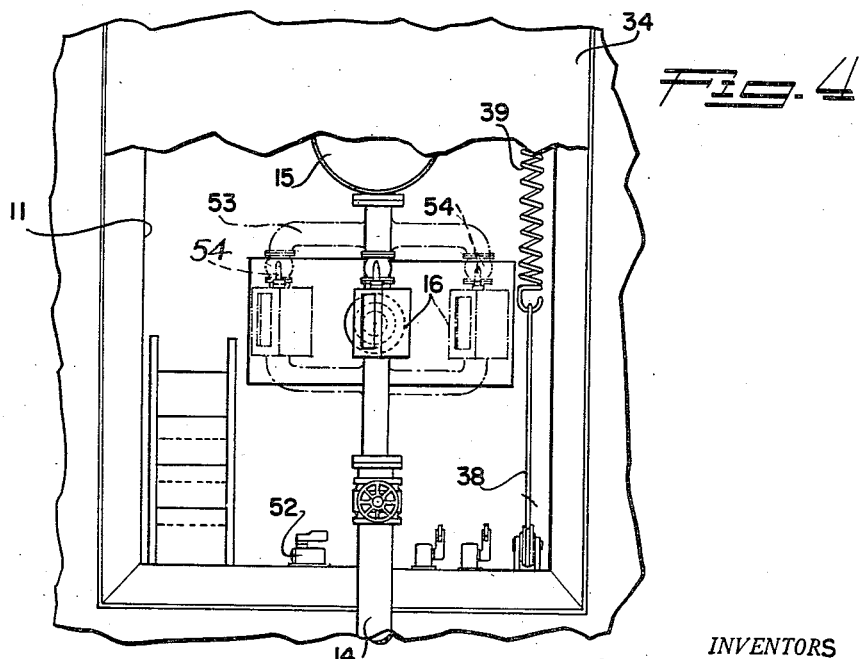
Figure 4 is a top view of the meter pit with a portion of the cover broken away.

The several meters 16 shown in Figures 2 to 4 are connected to parallel between manifolds 53 connected to the filter and the fuel line to the reel pits, and each meter is provided with a locked valve 54 opening of which brings the meter into service. One meter may be reserved for servicing transient customers, while the other two or more may be assigned to regular customers who are provided with keys to the meter valves 53 assigned to them, to enable them to service their own airplanes with the meters accumulating the total fuel usage over a desired accounting period.

In the operation of the fueling station of this invention, an airplane to be refueled is parked in its normal loading position adjacent the metering and hose reel pits. The pit cover doors 35 are then manually opened and latched in that position by the links 42 and 43, the door also reactivating the various electrical connections by releasing the switches held open by closing the doors, and opening the fuel valve 48 in the metering pit. The hoses 19 are then drawn off the reels 17 and the nozzles thereon inserted in the airplane fuel tank wells. Simultaneously the operator enters the meter pit 11 to open the proper meter valve 54, and close the starting circuit for the fuel pump, as described in our companion patent application previously identified. The meter pit operator does not have to remain therein during the refueling operation but is expected to return to close the meter valve 53 and to stop the pumping unit. In the event he fails to do so, the closure of the metering pit door automatically opens the control circuit switch 52 and closes the valve 48 to prevent further flow of fuel.

Actual delivery of fuel to the airplane tanks is controlled at the hose nozzles 20. Upon release of the nozzles the hose is wound back on the reels 17 by stepping on the treadle 24 causing the motor 22 to start, and engage the clutch, driving the reel backwards. After the hose has been wound on the reel, closing of the pit door 35 deactivates the electrical circuits.

Having described only a typical form of the invention we do not wish to be limited to the specific details herein set forth, but wish to reserve to ourselves any variations or modifications that may appear to those skilled in the art and fall within the scope of the following claim.

We claim:

An underground aircraft refueling system for airplanes comprising a first pit, a fuel supply pipe leading into the first pit, second and third pits spaced from the first pit and from one another, a fuel line leading from the first pit to the second and third pits, hose reels in the second and third pits, hoses wound on the reels and provided with valved fuel dispensing nozzles, the hoses being adapted to be unreeled for extension from the second and third pits so as to supply fuel to the aircraft, meters in the first pit manifolded in parallel relation between said fuel supply pipe and said fuel line, power driven means in the second and third pits for rotating their respective reels to receive the respective hoses, cover means for the pits, the cover means for the first pit including an access door adapted to be raised, a self closing valve in the first pit for controlling the flow of fuel through said supply pipe, means actuated by the door upon moving the same to the closed position for closing said valve, the cover means for the second and third pits including access doors adapted to be raised so that said hoses may be withdrawn from said pits, treadle means for switching on said power driven means, and means for switching off said power driven means when said access doors for said second and third pits are closed.

References Cited in the file of this patent

UNITED STATES PATENTS

| | | |
|---|---|---|
| 1,759,708 | Peter | May 20, 1930 |
| 1,773,484 | Harks | Aug. 19, 1930 |
| 1,868,497 | Griffith et al. | July 26, 1932 |
| 1,872,418 | Davis | Aug. 16, 1932 |
| 2,084,548 | Bennett | June 22, 1937 |
| 2,339,668 | Baldwin et al. | Jan. 18, 1944 |